(12) United States Patent
Sato et al.

(10) Patent No.: US 6,902,192 B2
(45) Date of Patent: Jun. 7, 2005

(54) STEERING COLUMN FOR MOTOR VEHICLE

(75) Inventors: Kenji Sato, Kitagunma-Gun (JP); Sakae Matsumoto, Takasaki (JP)

(73) Assignee: NSK Ltd., Tokyo (JP)

( * ) Notice: Subject to any disclaimer, the term of this patent is extended or adjusted under 35 U.S.C. 154(b) by 93 days.

(21) Appl. No.: 10/440,813

(22) Filed: May 19, 2003

(65) Prior Publication Data
US 2003/0217613 A1 Nov. 27, 2003

(30) Foreign Application Priority Data

| | | |
|---|---|---|
| May 21, 2002 | (JP) | 2002-146694 |
| Aug. 26, 2002 | (JP) | 2002-245636 |
| Sep. 19, 2002 | (JP) | 2002-273484 |

(51) Int. Cl.[7] .............................................. B62D 1/18
(52) U.S. Cl. ......................... 280/775; 280/779; 74/493
(58) Field of Search ............................... 280/775, 779; 74/493, 494, 495, 530, 531

(56) References Cited

U.S. PATENT DOCUMENTS

| 5,199,319 A | * | 4/1993 | Fujiu | 74/493 |
|---|---|---|---|---|
| 5,613,404 A | * | 3/1997 | Lykken et al. | 74/493 |
| 6,035,739 A | | 3/2000 | Milton | 74/493 |
| 6,189,405 B1 | * | 2/2001 | Yazane | 74/493 |
| 6,450,531 B1 | * | 9/2002 | Rinker et al. | 280/775 |
| 6,467,367 B2 | | 10/2002 | Kim et al. | 74/493 |
| 6,543,807 B2 | * | 4/2003 | Fujiu et al. | 280/775 |
| 6,623,036 B2 | * | 9/2003 | Yamamura et al. | 280/775 |
| 6,792,824 B2 | * | 9/2004 | Jolley et al. | 74/493 |

FOREIGN PATENT DOCUMENTS

GB          2 281 375 A          3/1995

* cited by examiner

*Primary Examiner*—Paul N. Dickson
*Assistant Examiner*—Toan C To
(74) *Attorney, Agent, or Firm*—Sidley Austin Brown & Wood LLP

(57) ABSTRACT

A steering column is structured such that a clamp/unclamp mechanism of a telescopic mechanism and a tilting mechanism can be operated by a single control lever located in the vicinity of a steering wheel, and that no part juts out of the steering column to improve reliability and controllability. When the control lever is pulled to rock on the center of the lever center axis, a tilt head is unclamped, while the rocking motion of the control lever turns a pusher plate, thereby pushing a pusher rod and also turning a column clamp shaft through a rocking arm. With the rotation of the column clamp shaft, the clamp is released to allow a column head to move. Since the column clamp shaft turns parallelly with the direction of movement of the column head, the column head can be clamped/unclamped regardless of its position.

16 Claims, 14 Drawing Sheets

STEERING COLUMN FOR MOTOR VEHICLE

This application is based on applications No. 2002-146694, No. 2002-245636, and No. 2002-273484 filed in Japan, the contents of which are hereby incorporated by reference.

BACKGROUND OF THE INVENTION

1. Field of the Invention

This invention relates to a steering column, and more particularly, to a steering column for motor vehicle having a telescopic mechanism and a tilting mechanism.

2. Description of Related Art

The telescopic mechanism and the tilting mechanism of the steering column aim at adjusting the back-and-forth position and tilt angle of a steering wheel to the easiest-to-manipulate position according to the driver's body form and taste.

The telescopic mechanism and the tilting mechanism have a clamp/unclamp mechanism for adjusting the level and tilt angle of the steering wheel. When the adjustment is made, the clamp/unclamp mechanism is cancelled once, and is operated to clamp again after the adjustment.

The adjustment of forward-and-backward position and tilt angle of the steering wheel is performed by manipulating the steering wheel. Therefore, it is desirable to operate the clamp/unclamp mechanism without releasing the thumb from the steering wheel. There has been disclosed in British Patent No. 2281375 a steering column fitted with a single control lever which can be manipulated without removing the thumb from the steering wheel.

In the steering column disclosed in British Patent stated above, the movement of the control lever is transmitted to the back-and-forth position adjusting clamp apparatus through a cable movable in a flexible tube. The cable and the tube have a large-radius curve of a sufficiently little curvature so that the cable can freely move in the entire range of adjustment of the steering wheel. The cable, therefore, partly juts out of the outline of the steering column, not only looking awkward but becoming a cause of trouble. Moreover, the transmission mechanism including the cable and the tube not only has low reliability but can not smoothly operate because the cable is expandable.

SUMMARY OF THE INVENTION

It is therefore an object of this invention to provide a steering column equipped with a highly reliable, easy-to-operate clamp/unclamp mechanism. The clamp/unclamp mechanism of either of the telescopic mechanism and the tilting mechanism has no part jutting out of the steering column and is operated by a single lever located near the steering wheel.

The telescopic mechanism, including the steering column, is clamped with the frictional force. Since clamping is done by utilizing the frictional force, the clamp section is likely to slip when a great force is applied. Passenger cars in these years have come to be equipped with an air bag system as standard equipment. The air bag system is designed on the premise that the steering wheel is supported with stability when the air bag is operated. Therefore, it has been demanded that the steering wheel will not move at the time of the secondary collision, that is, the clamp section of the telescopic mechanism will not slip with a force resulting from the secondary collision.

In order to meet the demand stated above, therefore, it is another object of this invention to provide the steering column that the clamp section will not easily slip with the force caused by the secondary collision.

The objects stated above can be accomplished by the following means. That is, the steering column of the first invention is a steering column which comprises: a fixed column member fitted with a mounting section for mounting the steering column to the vehicle body; a moving column member which is supported on the fixed column member, and is unrotatable around the center axis and movable in the direction of the center axis; a column head located on one end side of the moving column member; a tilt head supported in a tiltable manner on the column head; a wheel shaft rotatably supported on the tilt head, for fixing the steering wheel on one end; a column clamp shaft mounted on the column head and rotatable around the center axis parallel with the center axis of the moving column member; a column clamp movable in relation to the column clamp shaft, for clamping/unclamping the moving column member on the fixed column member with the rotation of the column clamp shaft; a tilt head clamp for clamping/unclamping the tilt head on the column head; a control lever having a rocking pivot shaft on the tilt head; and a mechanical transmission apparatus which changes the rocking motion of the control lever into the rotation of the column clamp shaft, and transmits the rotation to the column clamp and the tilt head clamp.

The steering column of the second invention is characterized in that the mechanical transmission apparatus, in the steering column of the first invention, has a pusher plate which is mounted on the control lever and can contact one end of the pusher rod, a pusher rod slidable in a direction parallel with the tilting axis of the tilt head and supported on the column head, and a rocking arm with one end engaged with the pusher rod and with the other end fixed on the column clamp shaft; as the control lever is operated, the rocking motion of the control lever is changed successively into the rocking motion of the pusher plate, axial motion of the pusher rod, rocking motion of the rocking arm, and rotating motion of the column clamp shaft.

The steering column of the third invention is characterized in that, in the steering column of the second invention, the pusher rod is fitted with a spring for pushing the pusher rod toward the pusher plate.

The steering column of the fourth invention is characterized in that, in the steering column of the third invention, the control lever, when not operated, is held by the spring in a position off the steering wheel. The spring functions also to impart a force for keeping the column clamp and the tilt head clamp in their clamp positions.

The steering column of the fifth invention is characterized in that, in the steering column of the first invention, the column clamp shaft has a noncircular cross sectional form.

The steering column of the sixth invention is characterized in that, in the steering column of the fifth invention, the noncircular cross sectional portion of the column clamp shaft is longer than the movable length of the moving column member.

The steering column of the seventh invention is characterized in that, in the steering column of the fifth invention, the noncircular cross section is substantially elliptical.

The steering column of the eighth invention is characterized in that, in the steering column of the first invention, the pusher plate has a sufficiently wide contact surface capable of constant contact with the pusher rod within the entire tilt range of the tilt head.

The steering column of the ninth invention is characterized in that, in the steering column of the first invention, the control lever can be operated without releasing the thumb from the steering wheel.

The steering column of the tenth invention is characterized in that, in the steering column of the first invention, the control lever has a control lever body section and a control lever end pivoted thereon; the control lever being foldable between an operating position, in which the control lever end is operable with a finger without removing the thumb from the steering wheel, and a retreat position which is off the steering wheel.

The steering column of the eleventh invention is characterized in that, in the steering column of the tenth invention, the control lever end of the control lever is pressed by a spring toward the retreat position.

The steering column of the twelfth invention is characterized in that, in the steering column of the eleventh invention, the control lever end has a locking projection, and a locking hole is formed in the tilt head, for fitting the locking projection therein when the control lever is folded in the retreat position.

The steering column of the thirteenth invention is characterized in that, in the steering column of the tenth invention, the tilt head is provided with a cowl which covers the tilt head, and has a shaft hole through which the wheel shaft is installed, and a lever hole which is connected with, or separate from, said shaft hole, and through which said control lever is installed, and that the control lever end will be close to the cowl when the control lever is folded to the retreat position.

The steering column of the fourteenth invention is characterized in that, in the steering column of the thirteenth invention, the control lever end has a locking projection; and a locking hole is formed in the cowl so that the locking projection may enter the locking hole when the control lever is folded into the retreat position.

The steering column of the fifteenth invention is characterized in that, in the steering column of the first invention, the column clamp has an inclined surface facing the moving column member, including the first and second wedges slidably supported on the fixed column member, a clamp bar fixed on the first wedge to move the wedges in mutually approaching directions, and a reaction member installed on the clamp bar. The column clamp shaft is located between the second wedge and the reaction member. The second wedge and the reaction member are provided on the contact surfaces with projections and depressions for engagement with the column clamp shaft.

The steering column of the sixteenth invention is characterized in that, in the steering column of the fifteenth invention, the noncircular cross section is substantially elliptical, and the long-diameter portion has the projections and depressions stated above.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and together with the description, serve to explain the principles of the invention.

DESCRIPTION OF THE PREFERRED EMBODIMENTS

Now, preferred embodiments of the present invention will be described in detail while referring to the accompanying drawings.

First Embodiment

General Outline

Figure 1:
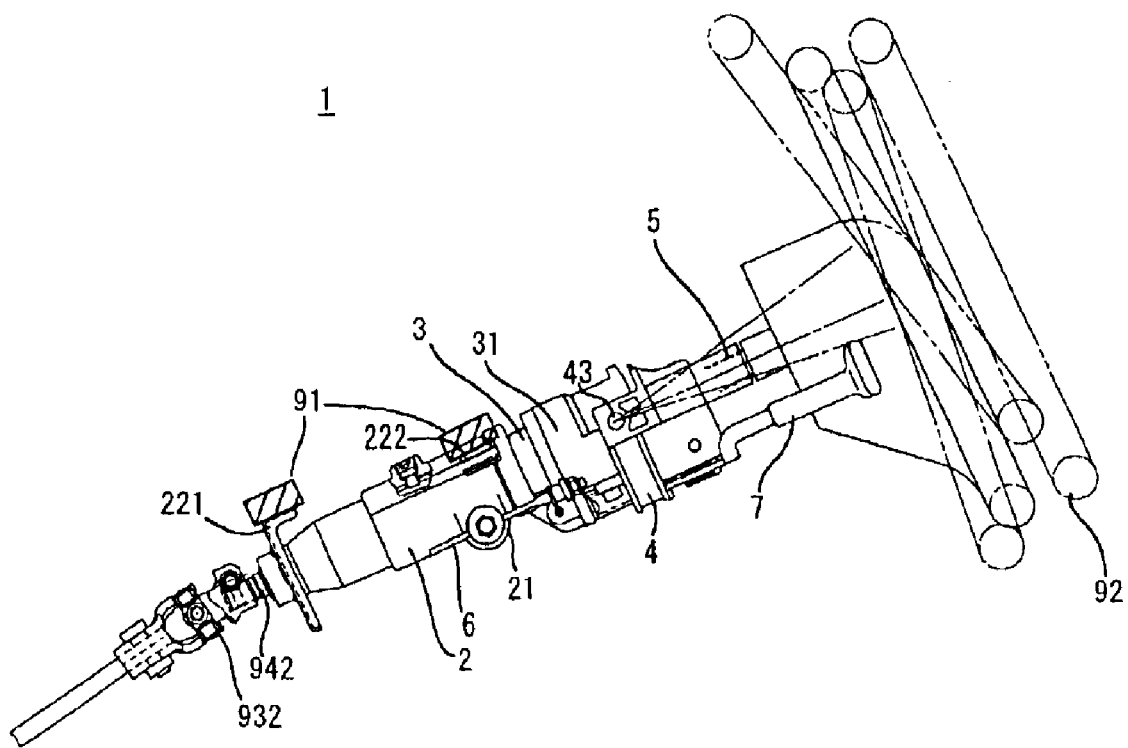
FIG. 1 is an outside view of a steering column 1.

FIG. 1 is an outside view of a steering column 1 according to the first embodiment of this invention. The steering column 1 has a fixed column member 2, a moving column member 3, a column head 31, a tilt head 4, a wheel shaft 5, a column clamp 21, a tilt head clamp 41 (see FIG. 2), an control lever 7, and a mechanical transmission apparatus.

The fixed column member 2 is fitted with mounting sections 221 and 222 for mounting to the vehicle body 91. On the fixed column member 2 the moving column member 3 is supported unrotatably around the center axis and movably in the direction of the center axis. The column head 31 is mounted on one end of the moving column member 3. On the column head 31, the tilt head 4 is supported in such a manner that it can tilt on the center of a tilt center axis 43. On the tilt head 4 the wheel shaft 5 is rotatably supported. A steering wheel 92 is fixed on one end of the wheel shaft 5.

On the column head 31, a column clamp shaft 6, which is rotatable around an axis parallel with the center axis of the moving column member 3, is mounted. The fixed column member 2 has the column clamp 21. The column clamp shaft 6 is movable in relation to the column clamp 21. With the rotation of the column clamp shaft 6 the moving column member 3 can be clamped or unclamped.

The column head 31 is fitted with the tilt head clamp 41, which clamps and unclamps the tilt head 4 in relation to the column head 31. On the tilt heat 4 is supported the control lever 7 by means of the rocking pivot. The control lever 7 can be operated without removing the thumb from the steering wheel 92. The rocking motion of the control lever 7 is changed into the rotation of the column clamp shaft 6 through the mechanical transmission apparatus. The rotation is transmitted to the column clamp 21 to thereby clamp/unclamp the moving column member 3. Furthermore, the rocking motion of the control lever 7 is transmitted to the tilt head clamp 41, thus clamping/unclamping the tilt head 4.

The wheel shaft 5 is connected at one end to the universal joint 931 in the steering column 1. The wheel shaft 5 is further connected to a front wheel steering mechanism through a pair of upper intermediate shaft 941 and lower intermediate shaft 942 which are splined (FIG. 3) and the lower universal joint 932. In FIG. 1, the dot line indicates some examples of adjustments of the position and posture of the steering wheel 92.

Tilt Head Clamp

Figure 2:
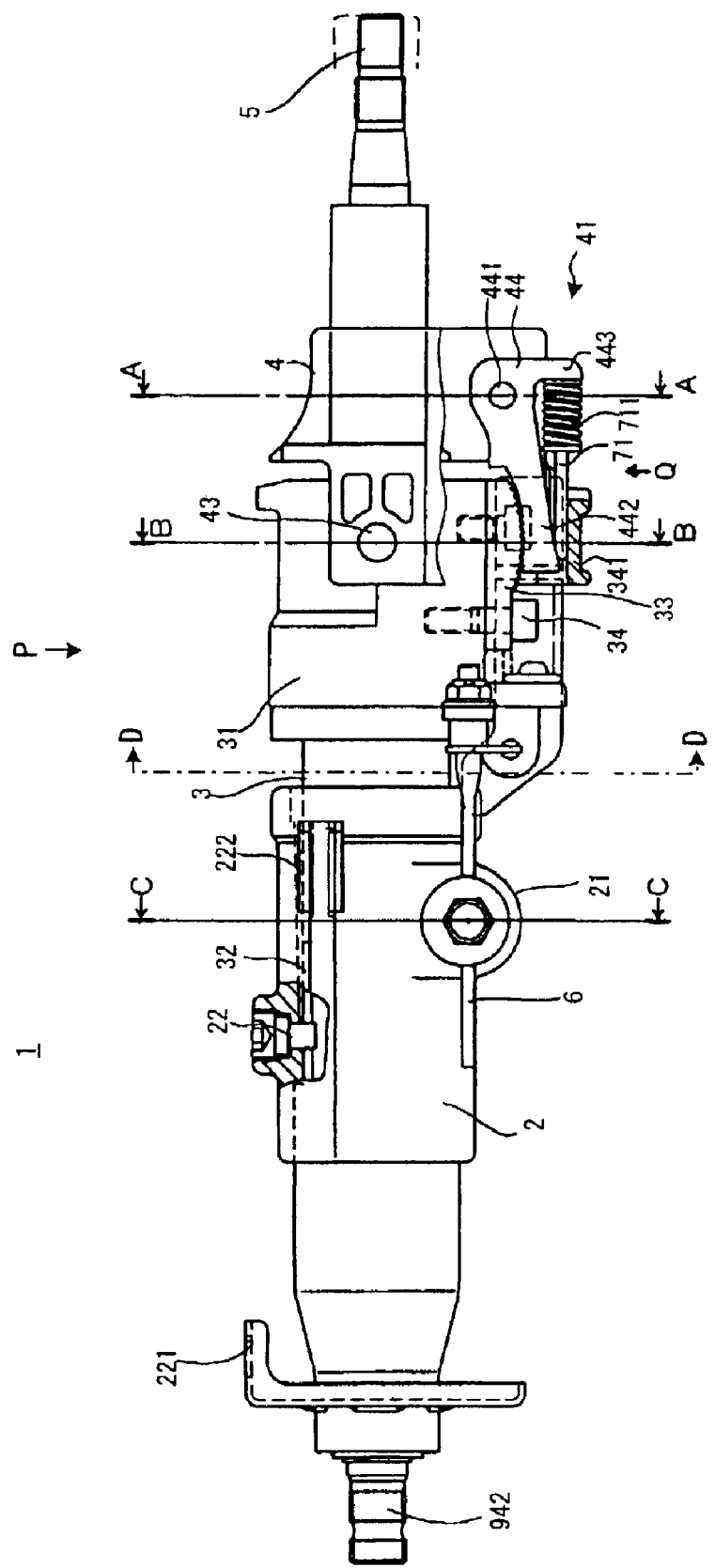
FIG. 2 is an enlarged, partly cutaway view of a major portion of FIG. 1 showing the steering column 1, and this view is commonly applicable to the first to fifth embodiments.
Figure 3:
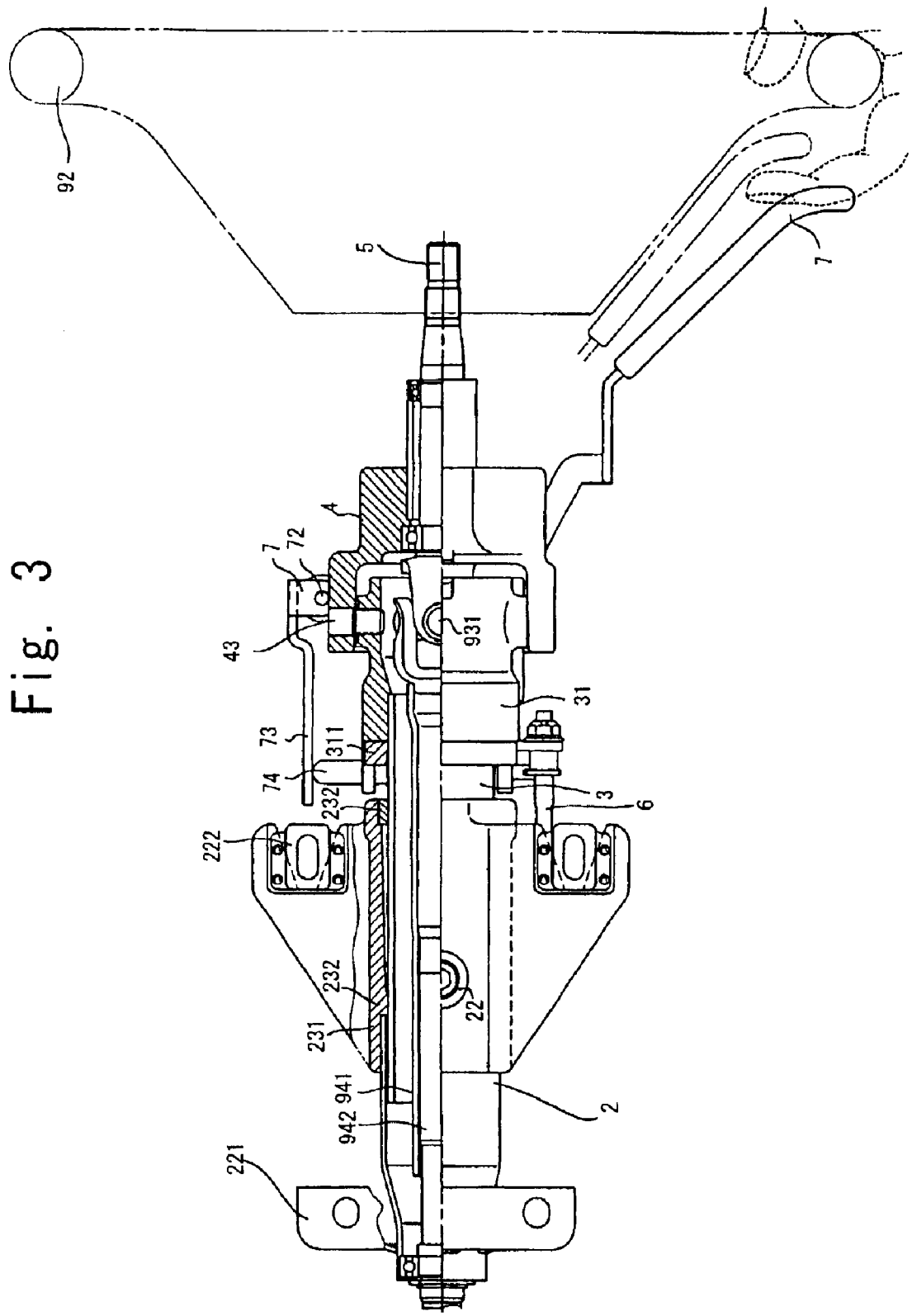
FIG. 3 is a top partly cutaway view (as viewed in the direction P) of FIG. 2, showing the steering column 1 of the First Embodiment.
Figure 4:
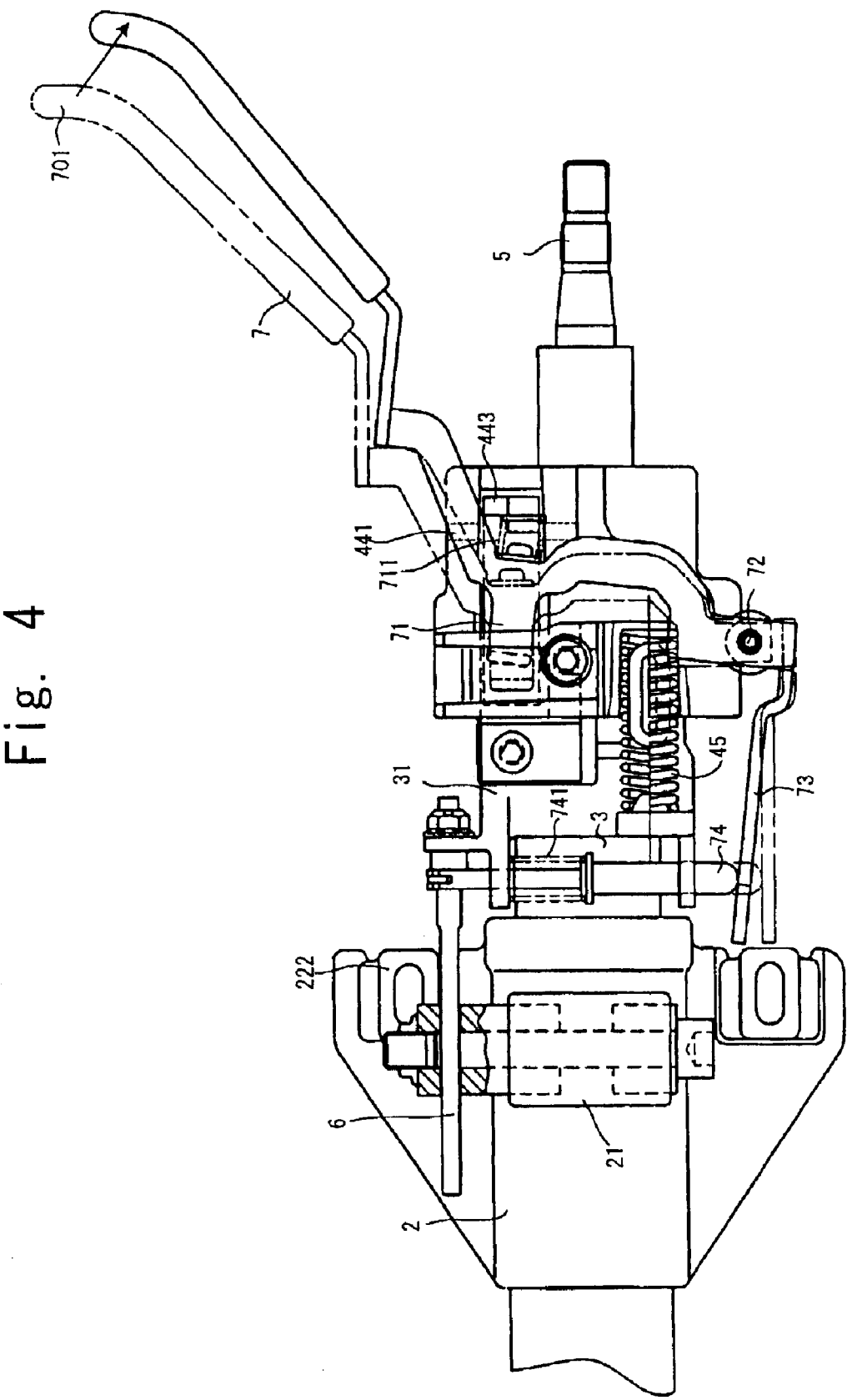
FIG. 4 is a bottom view (as viewed in the direction Q) of FIG. 2, showing the steering column 1 of the first embodiment.
Figure 5:
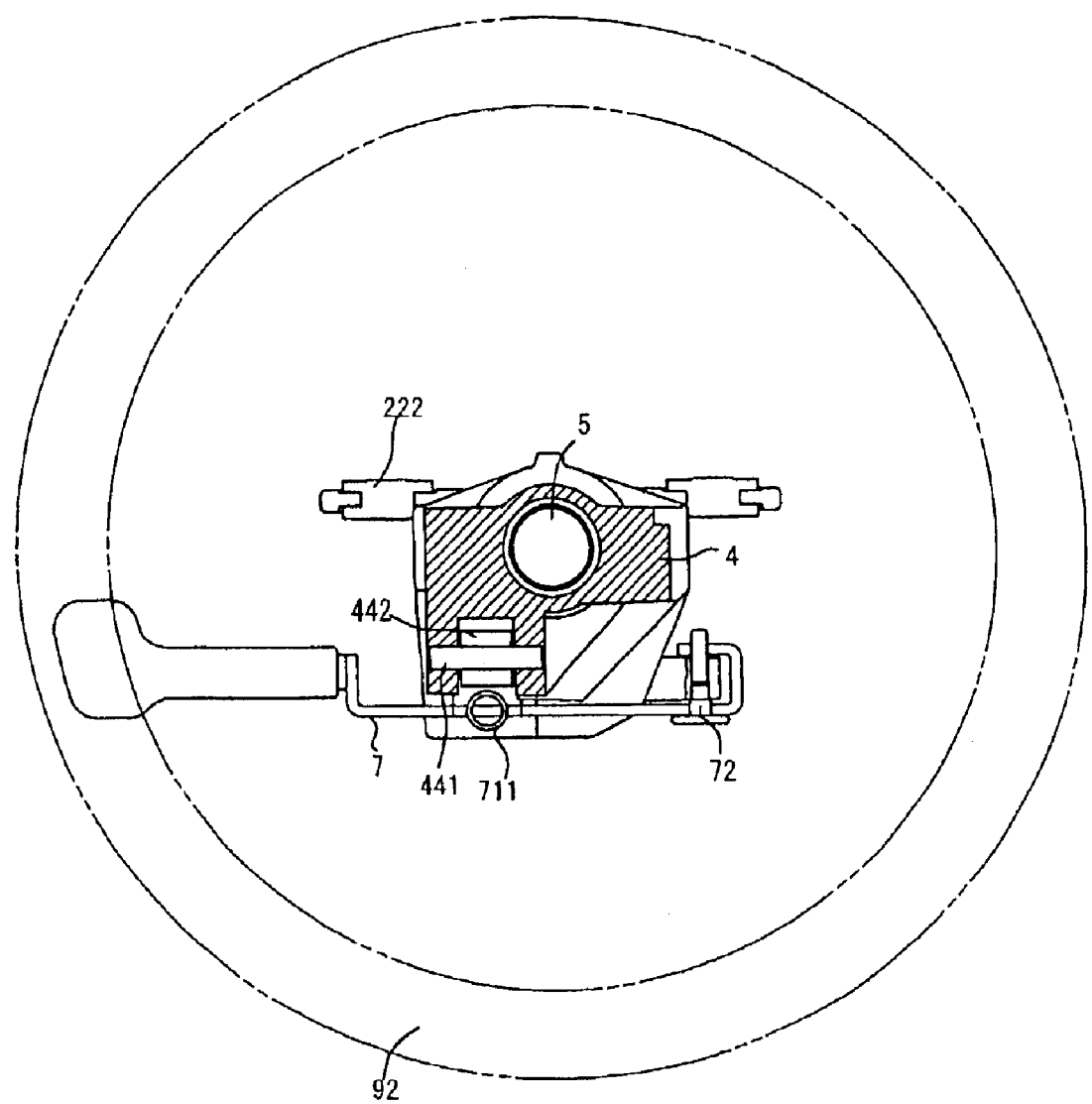
FIG. 5 is a cross sectional view of the steering column 1 of the first to fifth embodiments, showing an A—A cross section in FIG. 2.
Figure 6:
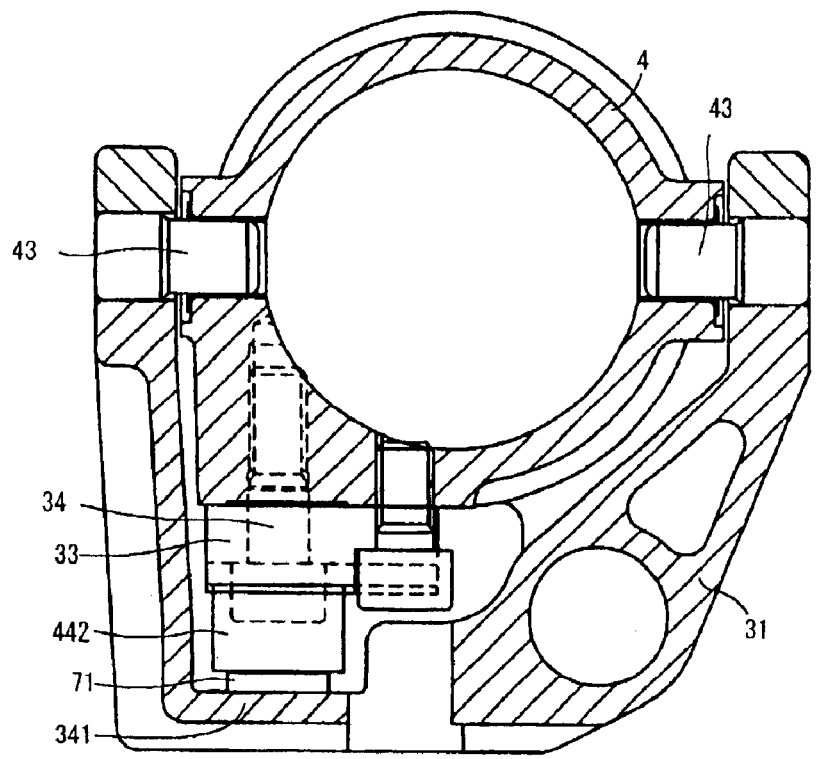
FIG. 6 is a cross sectional view of the steering column 1 of the first to fifth embodiments, showing a B—B cross section in FIG. 2.
Figure 7:
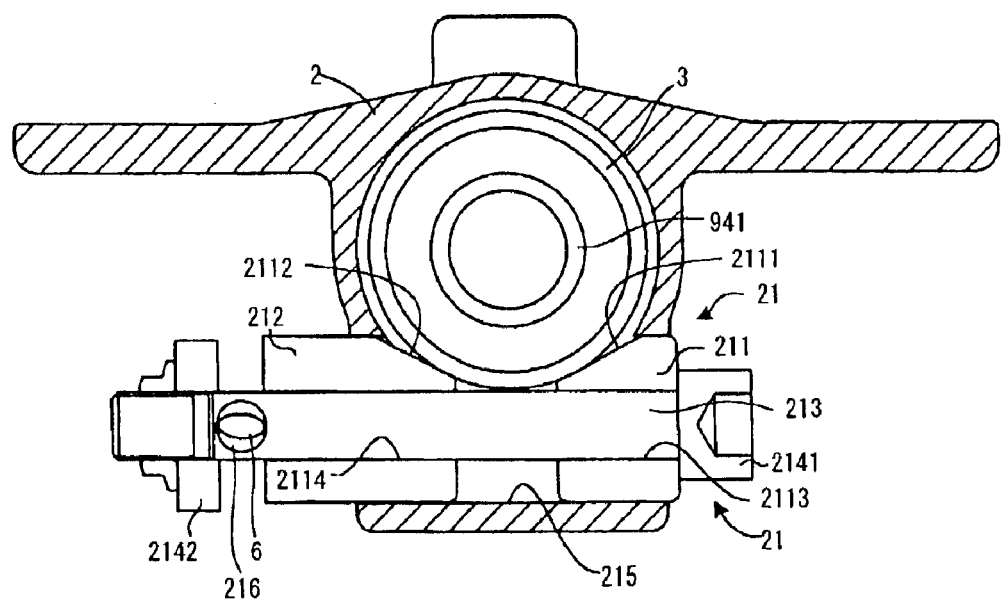
FIG. 7 is a cross sectional view of the steering column 1 of the first to fourth embodiments, showing a C—C cross section in FIG. 2.

FIG. 2 is an enlarged, partly cutaway view of a major portion shown in FIG. 1, of the steering column 1. FIG. 3 is a top partly cutaway view of the steering column 1 as viewed from above (in the direction P). FIG. 4 is a bottom view of the steering column 1 as viewed from below (in the direction Q) in FIG. 2. FIGS. 5, 6, and 7 are sectional views taken along lines A—A, B—B, and C—C in FIG. 2.

The tilt head clamp 41 is structured as described below. A segment gear 33 (FIG. 2) having its center on the tilt center axis 43 is fastened to the moving column member 3 by a bolt 34. And a back contact member 341 is installed with a space provided between the contact member 341 and the segment gear 33. Within the space stated above, a gear portion 442 of the gear arm 44 rotatably supported on the center of a shaft 441 in the tilt head 4 and a projecting portion 71 of the control lever 7 are installed.

The gear arm 44 is L-shaped, comprising a couple of legs. One of the legs carries the gear portion 442. A spring 711 is interposed between the other leg 443 of the gear arm 44 and the back of the projecting portion 71, to thereby provide a bias to widen a clearance between the back of the projecting portion 71 and the leg 443.

The projecting portion 71 is pressed leftward by the bias, thereby pushing the gear portion 442 from behind. Therefore, the gear portion 442 is pressed against the segment gear 33, so that the teeth of both gears maybe mutually engaged. When the gear portion 442 is pressed against the segment gear 33, the reaction to the projecting portion 71 is received by the back contact member 341 (FIGS. 2 and 6), to thereby lock the tilt head 4. The tilt head 4 is locked in stepped positions at an angle at which the gear portion 442 and the segment gear 33 can be engaged.

When the projecting portion 71 of the control lever 7 moves rightward in FIG. 2, the gear arm 44 is turned counterclockwise in FIG. 2 by the force of the spring 711, disengaging these teeth. Therefore, when the tilt position is adjusted (at this time, the longitudinal position is also adjustable), the projecting portion 71 is moved rightward by the operation of the control lever 7.

Universal Joint and Intermediate Shaft

As shown in FIG. 3, an upper universal joint 931 is located between the end of the upper intermediate shaft 941 and the end of the wheel shaft 5. The center of the universal joint 931, being on the axis of the tilt center axis 43, will not be affected when the tilt head 4 is tilted.

The lower intermediate shaft 942 is rotatably supported on the fixed column member 2. Since the lower intermediate shaft 942 and the hollow upper intermediate shaft 941 are splined, the moving column member 3 can move rightward and leftward in FIG. 3. Because of the adoption of splines, the rotation of the upper intermediate shaft 941 can be transmitted to the lower intermediate shaft 942 regardless of the position of movement. Accordingly, the rotation of the steering wheel 92 can be transmitted to the lower intermediate shaft 942 if the level of the steering wheel 92 is adjusted.

Fixed Column Member and Moving Column Member

As shown in FIG. 2, in the cylindrical portion of the moving column member 3, a long hole 32 is formed along the axial direction. In the long hole 32, a stopper member 22 is engaged with the fixed column member 2 in the long hole 32. It is prevented by the long hole 32 and the stopper member 22 that the moving column member 3 will come out of the fixed column member 2 and rotate in relation to the fixed column member 2. Therefore, the moving column member 3 is movable in the axial direction in the fixed column member 2 and within the range of the long hole 32.

The fixed column member 2 has a cylindrical portion 231. Ring-shaped sliding guides 232 are provided in two positions in the cylindrical portion 231 (FIG. 3). The outside surface of the cylindrical portion of the moving column member 3, being guided by the sliding guide section 232, is movable without a play in the axial direction of the moving column member 3. A cushioning stopper 311 installed on the end face of the column head 31 is a cushioning material made of rubber, synthetic resin, or other adopted to prevent an impactive collision between metal parts in case of a collision of the moving column member 3 against the end face of the fixed column member 2 at the time of adjustment.

Column Clamp

Figure 8:
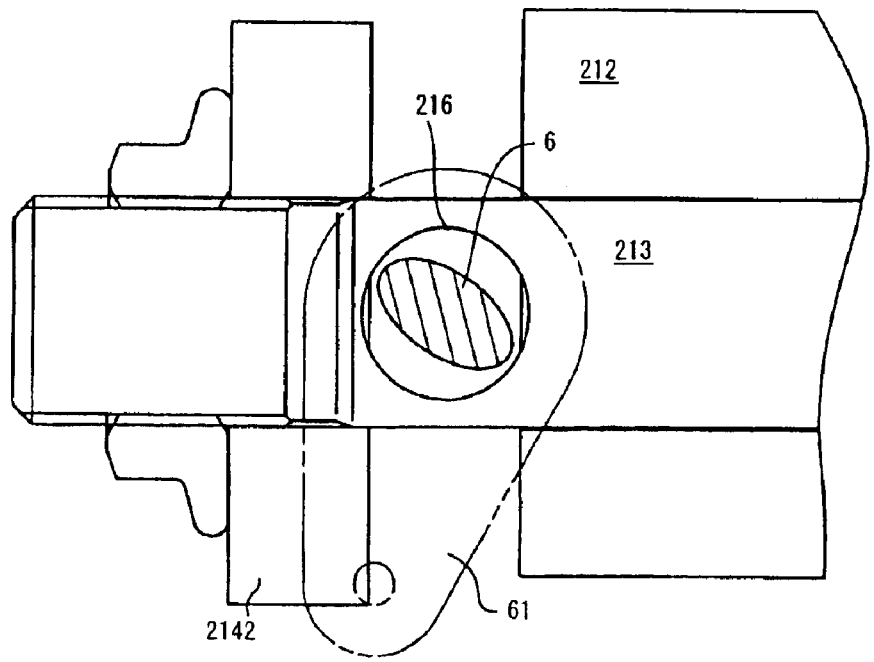
FIG. 8 is a partly enlarged view in FIG. 7, showing the position of rotation of a column clamp shaft 6 in the unclamped position.
Figure 9:
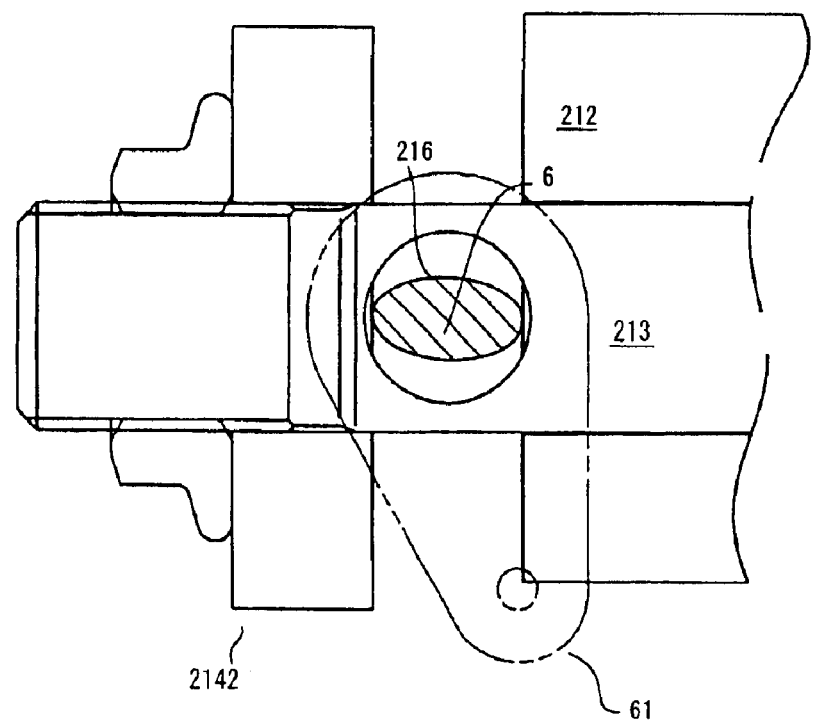
FIG. 9 is a partly enlarged view in FIG. 7, showing the position of rotation of the column clamp shaft 6 in the clamped position.

The structure of the column clamp 21 will be explained with reference to FIGS. 7, 8 and 9. FIG. 7 is a sectional view taken along line C—C in FIG. 2 as previously stated. And FIGS. 8 and 9 are partially enlarged views in FIG. 7, showing a relationship between the rotational position of the column clamp shaft 6 and the clamp/unclamp position. The column clamp 21 is installed on the fixed column member 2, and has a first wedge 211, a second wedge 212, a clamp bar 213, and reaction members 2141 and 2142. The fixed column member 2 has a wedge hole 215 made laterally. The wedge hole 215 is partly open to a cavity in the fixed column member 2. The first wedge 211 and the second wedge 212 are provided with inclined surfaces 2111 and 2112 respectively, and are located within the wedge hole 215 in such a manner that the inclined surfaces 2111 and 2112 will face each other. The inclined surfaces 2111 and 2112 of these two wedges, therefore, face the outside surface of the cylindrical portion of the moving column member 3.

The first wedge 211 and the second wedge 212 have clamp bar holes 2113 and 2114 through which the clamp bar 213 is inserted. On both ends of the clamp bar 213 the reaction members 2141 and 2142 which are larger in outside diameter than the clamp bar holes 2113 and 2114 are secured. The clamp bar 213 has a column clamp shaft hole 216 so formed as to contact one of the reaction members 2142. Through in this hole, a noncircular sectional portion of the column clamp shaft 6 which is substantially elliptical in shape is inserted.

On one end of the column clamp shaft 6 a rocking arm 61 is secured. The direction of the elliptical long diameter of the noncircular sectional portion on the column clamp shaft 6 inclines at the time of unclamping as shown in FIG. 8, and the long-diameter portion faces the axial direction of the clamp bar 213 at the time of clamping as shown in FIG. 9. Because of this structure, when the rocking arm 61 is turned to rock from the position in FIG. 8 the column clamp shaft 6 turns to the position in FIG. 9. At this time, when the reaction member 2142 is pressed leftward by one of the elliptical long-diameter portions, the clamp bar 213 is pulled leftward. Furthermore, the reaction member 2141 presses the first wedge leftward. On the other hand, the second wedge is pushed rightward by the other of the elliptical long-diameter portion.

As a result of the mutual approach of the two wedges, the inclined surfaces 2111 and 2112 press the outside surface of the cylindrical portion of the moving column member 3, to thereby clamp the moving column member 3 to the fixed column member 2. The first wedge 211 and the second wedge 212 can slightly move rightward and leftward as one body, and therefore there will never occur such an unbalanced movement that only one wedge will firmly press the moving column member 3.

When the rocking arm 61 is turned to rock in an opposite direction, the first wedge 211 and the second wedge 212 move reversely to go apart from each other, thus unclamping the moving column member 3.

Control Lever and Related Operation

Next, each member operating in interlock with the operation of the control lever 7 will be explained. The control lever 7 is located below the steering column 1. In FIG. 3, the control lever 7, a lever center axis 72 which is the center of rocking motion, a pusher plate 73 fixed on the control lever 7, and a pusher rod 74 are partly visible. In FIG. 4 giving a bottom view of these parts, the state of the whole body of the control lever 7 and the control lever operated to adjust the level and tilt of the steering wheel (i.e., the control lever end 701 of the control lever 7 pulled up toward the steering wheel 92) is indicated by the solid line (the dot line indicates the control lever unoperated).

The pusher rod 74 having a collar 742 is slidably supported on the column head 31 so as to be slidable in a direction parallel with the tilt center axis 43. Through on the pusher rod 74, a spring 741 is mounted to push the collar 742 leftward in FIG. 10. In the end portion of the pusher rod 74 there is formed a small long hole 743 in the direction at right angles to the pusher rod 74 the end of the pusher rod 74 is axially engaged with one end of the rocking arm 61 through the long hole 743. The long hole 743 functions to absorb the amount of departure from the rocking arm 61 when the pusher rod 74 is axially moved.

As the pusher rod 74 is moved leftward by the spring 741, the left end of the pusher rod 74 constantly contacts the pusher plate 73. The rocking arm 61 axially engaged with the right end of the pusher rod 74 is applied with a turning force to turn clockwise. The rocking force exerted to the rocking arm 61 holds the column clamp shaft 6 in the clamp position (FIG. 9. Note that the position in FIG. 9 differs in direction in FIG. 10). The rocking arm 61 in this position is indicated by a solid line.

Pusher Plate

Figure 11:
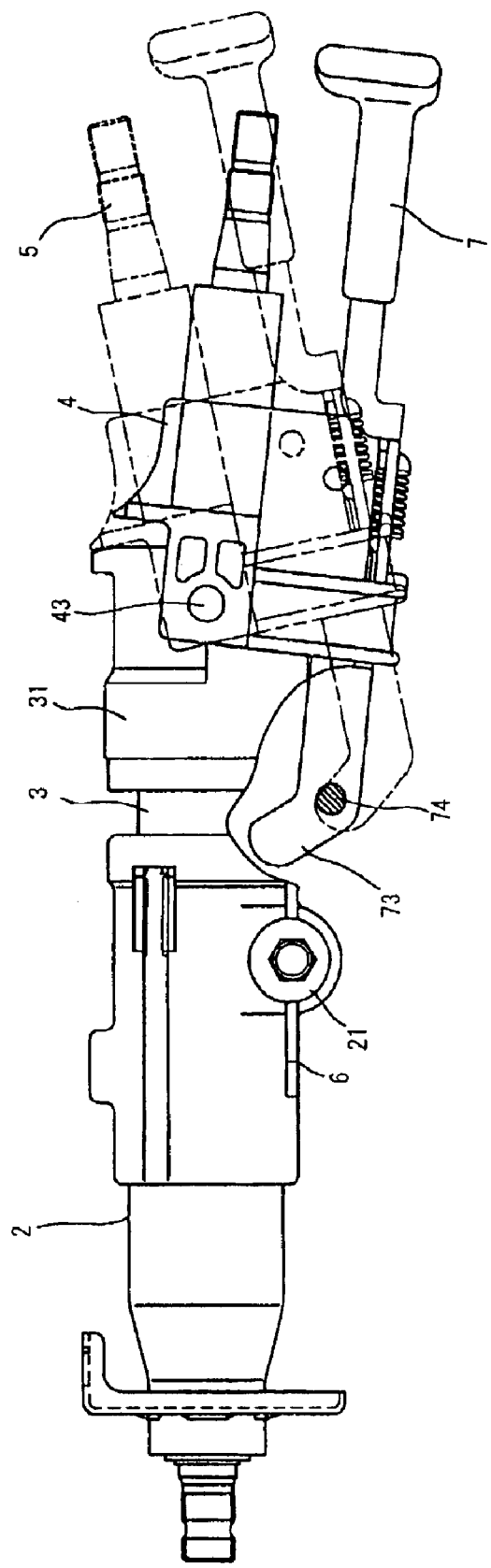
FIG. 11 is an explanatory view showing, by a dot line and a solid line, two tilt positions of a tilt head 4 of the first embodiment.

The tilt head 4 tilts on the column head 31. Therefore in accordance with the amount of tilt (angle), the position of the pusher rod 74 in relation to the pusher plate 73 varies. In FIG. 11, two tilt positions of the tilt head 4 are indicated by a dot line and a solid line. The pusher rod 74, being supported on the column head, will not be changed in position by tilting. The pusher plate 73, located off the tilt center axis 43, will change in position in relation to the pusher rod 74 when tilted. Therefore, the pusher plate 73 is provided with a wide contact surface bent like a hockey stick head so that the pusher rod 74 may contact the pusher plate 73 at any angle.

Steering Wheel Adjustment

Adjustments of level and tilt angle of the steering wheel 92 and operation of each member will hereinafter be explained. The driver pulls up the control lever 7 by extending for example all the fingers except the thumb which is left unreleased from the steering wheel 92 (FIG. 3). Thus, the control lever 7 turns on the center of the lever center axis 72 as shown in FIG. 4 (FIG. 4 is a bottom view, in which, therefore, the right and left sides are reversed).

With the operation of the control lever 7 the projecting portion 71 moves to the right in FIG. 2 to turn the gear arm 44 counterclockwise. As the gear arm 44 turns, the gear portion of the gear arm 44 is disengaged from the teeth of the segment gear 33, so that the tilt head 4 becomes tiltable (as indicated by a solid line in FIG. 4).

Figure 10:
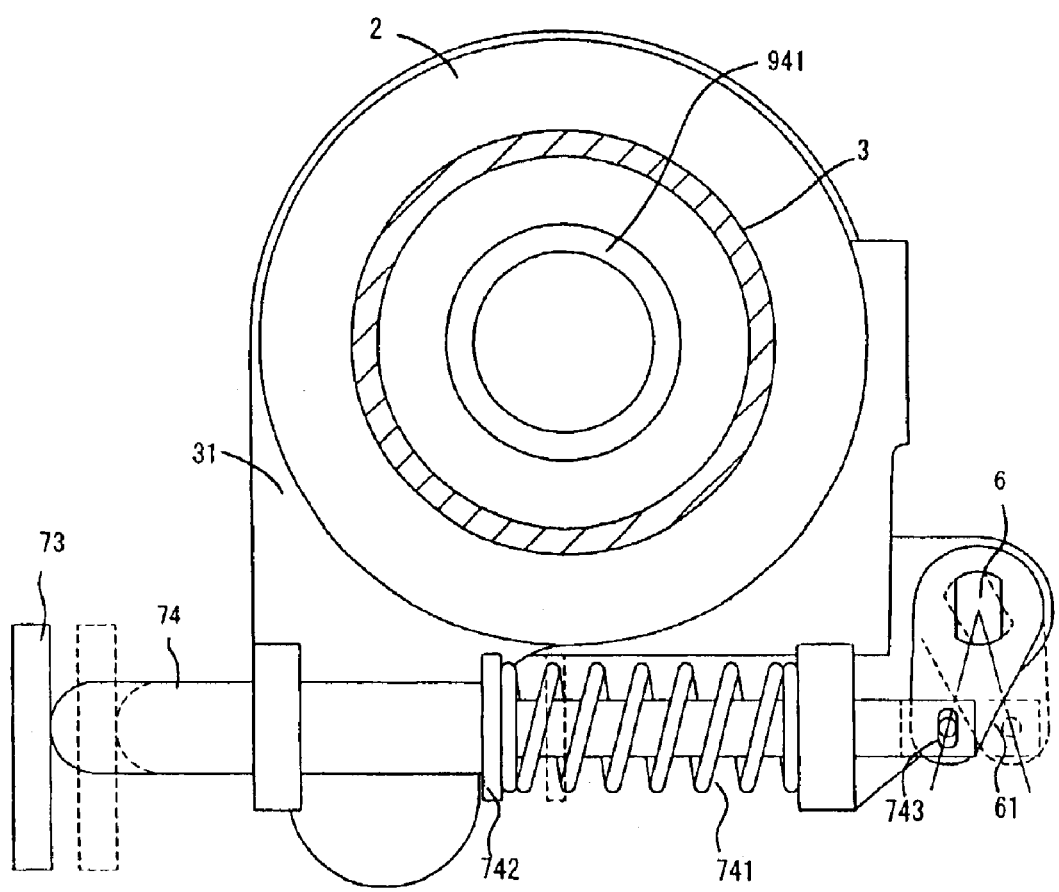
FIG. 10 is a cross sectional view of the steering column 1 of the first to fifth embodiments, showing a D—D cross section in FIG. 2.

At the same time, the rocking motion of the control lever 7 rocks the pusher plate 73 (FIG. 4). By the rocking motion, the pusher plate 73 overcomes the force of the spring 741, pushing the pusher rod 74 upward in FIG. 4. In FIG. 10 the movement stated above corresponds to the rightward movement of the pusher rod 74.

The rightward movement of the pusher rod 74 rocks the rocking arm 61 and accordingly turns the column clamp shaft 6 (FIG. 10). As the column clamp shaft 6 turns, the long-diameter portion thereof in the horizontal position as shown in FIG. 9 inclines as shown in FIG. 8. Thus, the first wedge 211 and the second wedge 212 that have approached each other as shown in FIG. 7 move away from each other to unclamp the moving column member 3.

The tilt head 4 is tiltable and the column head 31 is longitudinally movable. Therefore, the driver can adjust the back-and-forth position and the tilt position (angle) of the steering wheel 92 without removing the thumb from the steering wheel 92 and the control lever 7. When the tilt head clamp 41 is released, the weight of the tilt head 4 acts as a downward force on the tilt head 4, which therefore tilts down just like a man's drooping of his head. To counterbalance the downward force, therefore, there is provided a strong spring 45 (FIG. 4). The tilt head 4 is applied with a force for holding the steering wheel 92 in the top inclined position, so that the driver can easily get on and off the motor vehicle.

When the finger is removed from the control lever 7 after adjustment, the control lever 7 goes back to the original position (the position indicated by a solid line in FIG. 3) by the force of the spring 741 (and the spring 711). As the control lever 7 returns to the original position, the tilt head 4 and the column head 31 (the moving column member 3) are both clamped by reversing the above-described operation. The spring 741 functions to apply a force to hold the control lever 7 off the steering wheel 92 and to hold the column clamp 21 and the tilt head clamp 41 in their clamped positions respectively when the control lever 7 is not operated.

The operating portion (the top portion) of the control lever 7, if excessively pulled up close to the steering wheel 82, will interfere with the manipulation of the steering wheel during driving. Therefore, when no adjustment is made of the back-and-forth position and angle of the steering wheel, the operating portion stated above moves to a position an appropriate distance from the steering wheel. Furthermore, to reliably prevent such an interference, the control lever 7 may be structured to be foldable or extendable. Examples (second, third and fourth embodiments) of the collapsible control lever 7 will be given below.

Second Embodiment

The steering column 1 of the second embodiment, except the structure of the control lever 7, has a structure common to that of the steering column of the first embodiment. To avoid redundancy of explanation, only the control lever 7 and related structures which are different from the first embodiment will be explained, using the same reference numerals as those used in the explanation of the first embodiment.

Figure 12:
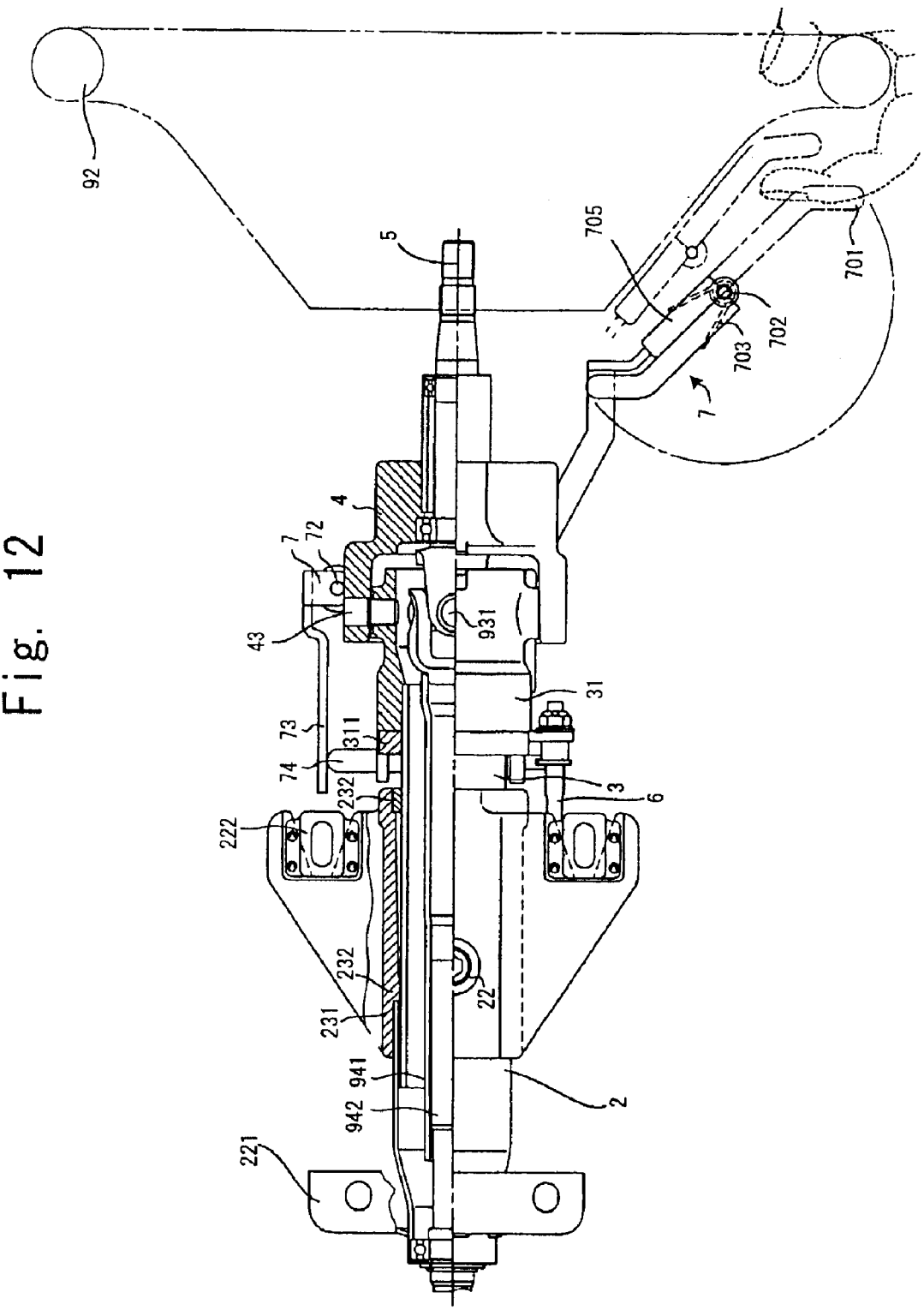
FIG. 12 is a top partly cutaway view (as viewed in the direction P) of FIG. 2, showing the steering column 1 of the second embodiment.

FIG. 12 is a top view, partly cut away, of the steering column 1 according to the second embodiment. FIG. 12 corresponds to FIG. 3 in the first embodiment. The control lever 7 in the second embodiment has a control lever body 705 and a control lever end 701 pivotally supported thereon. The control lever end 701 is foldable in between the operating position and the retreat position. In the operating position, the control lever 7 is operable by other fingers with the thumb left on the steering wheel 92. In the retreat position, the control lever is apart from the steering wheel 92 and can not be operated with the thumb left on the steering wheel 92.

The control lever end 701 is pivotally supported by a pivot shaft 702 on the end portion of the control lever body 705. On the pivot shaft 702 a spring (e.g., a coil spring 703) is fitted. Two hooked ends of the coil spring 703 are set respectively on the control lever body 705 and the control lever end 701. By the coil spring 703 the control lever end 701 is applied with a bias force for folding the control lever in the retreat position indicated by a solid line in FIG. 12.

When adjusting the back-and-forth position and tilt angle of the steering wheel 92, the driver pulls out the control lever end 701 by releasing the finger once from the steering wheel 92. Thereafter, with the thumb put on the steering wheel 92, the driver pulls the control lever 7 by other finger. The control lever 7 thus pulled turns on the center of the lever center axis 72 as indicated by the dot line in FIG. 12. Therefore, both the tilt head 4 and the column head 31 (the moving column member 3) are unclamped by the same operation as the operation explained in the first embodiment. In this state, the back-and-forth position and tilt angle of the steering wheel 92 are adjusted.

Then, when the finger is removed from the control lever 7 the tile head 4 and the column head 31 (the moving column member 3) are clamped by the same operation as that explained in the first embodiment. At the same time, the control lever end 701 is folded by the bias force of the coil spring 703. The control lever end 701, moving back to the retreat position, will not interfere with the manipulation of the steering wheel 92 during driving.

Third Embodiment

The steering column 1 of the third embodiment has a structure substantially common to the steering column of the first embodiment excepting the provision of the cowl 35 and the structure of the control lever 7. To avoid redundancy of explanation, only the cowl 35, the control lever 7 and related structures which are different from the first embodiment will be explained; the same reference numerals as those used in the explanation of the first embodiment will be used.

Figure 13:
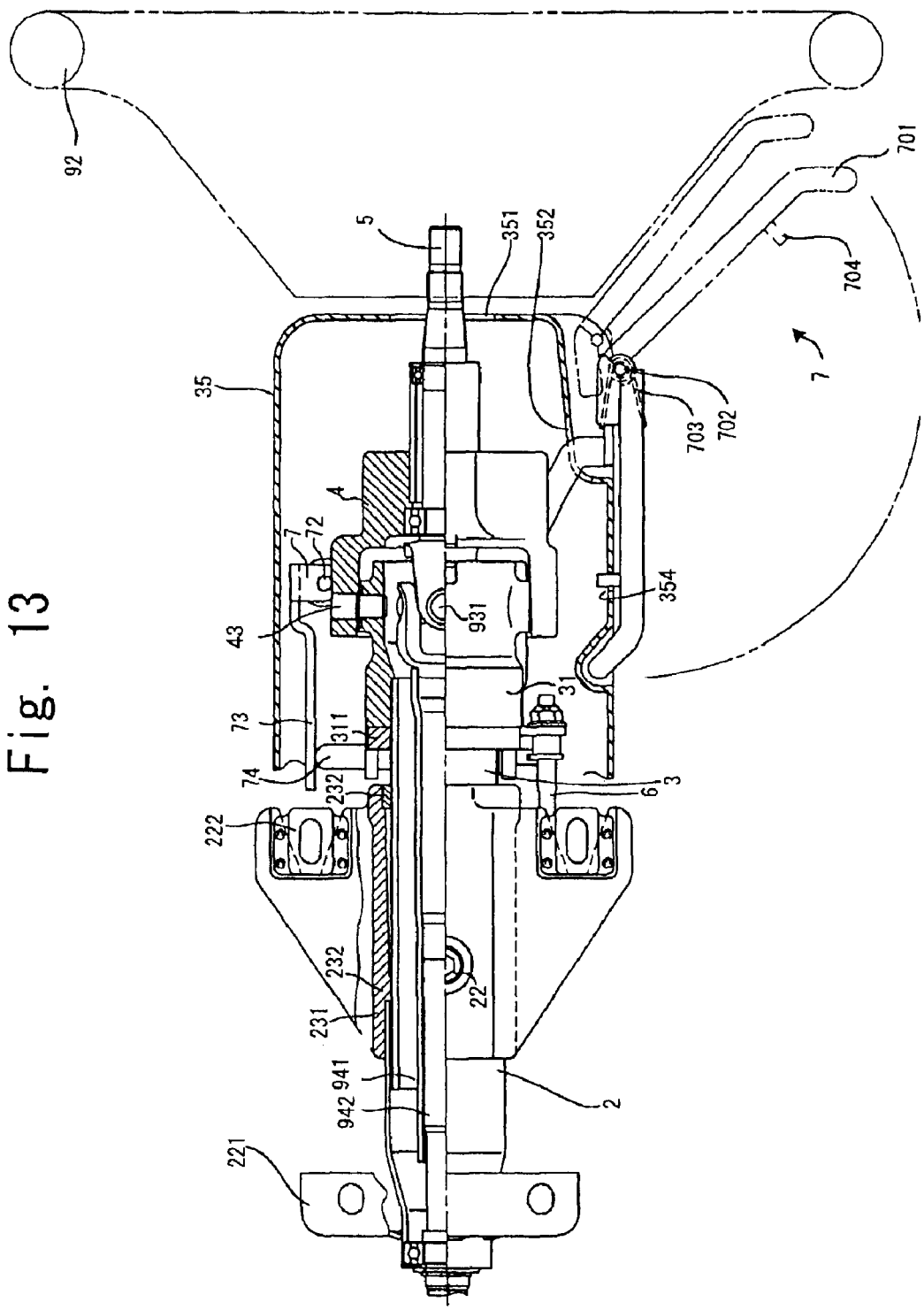
FIG. 13 is a top partly cutaway view (as viewed in the direction P) of FIG. 2, showing the steering column 1 of the third embodiment.

FIG. 13 is a top view, partly cut away, of the steering column 1 according to the third embodiment. FIG. 13 corresponds to FIG. 3 in the first embodiment. The cowl 35 is a cover for covering the tilt head 4 and the moving column member 3, and is fixed on the tilt head 4. The cowl 35 has a shaft hole 3 through which the wheel shaft 5 is mounted, and a lever hole 352 through which the control lever 7 is mounted.

In the side of the cowl 35, a dent is formed so that a part of the control lever end 701 folded can fit therein. In the vicinity of this dent there is formed a locking hole 354, in which the locking projection 704 provided on the control lever end 701 can fit.

Similarly to the steering column of the second embodiment, the control lever end 701 is pivotally supported by the pivot shaft 702. On the pivot shaft 702 a spring (e.g., a coil spring 703) is fitted. The two hooked ends of the coil spring 703 are set on the control lever body 705 and the control lever end 701 respectively. The control lever end 701 is applied with a bias force by the coil spring 703, to thereby fold the control lever 7 into the retreat position indicated by a solid line in FIG. 13.

Since the locking projection 704 fits in the locking hole 354, there will not occur such an accident that the control lever 7 malfunctions (unclamps) if thrust rightwardly in the event of a collapse by the secondary collision of the motor vehicle. The air bag installed in the steering wheel 92 is able to keep a normal position, thus enabling normally operating in the event of the secondary collision. The locking hole 354 may be formed directly in the tilt head 4.

In the third embodiment described above, the locking hole 354 is present in the cowl 35, but may be formed directly in the body of the tilt head 4. In the case of the steering column having no cowl 35, it is possible to eliminate the problem of unclamping in the event of the secondary collision.

Fourth Embodiment

Figure 14:
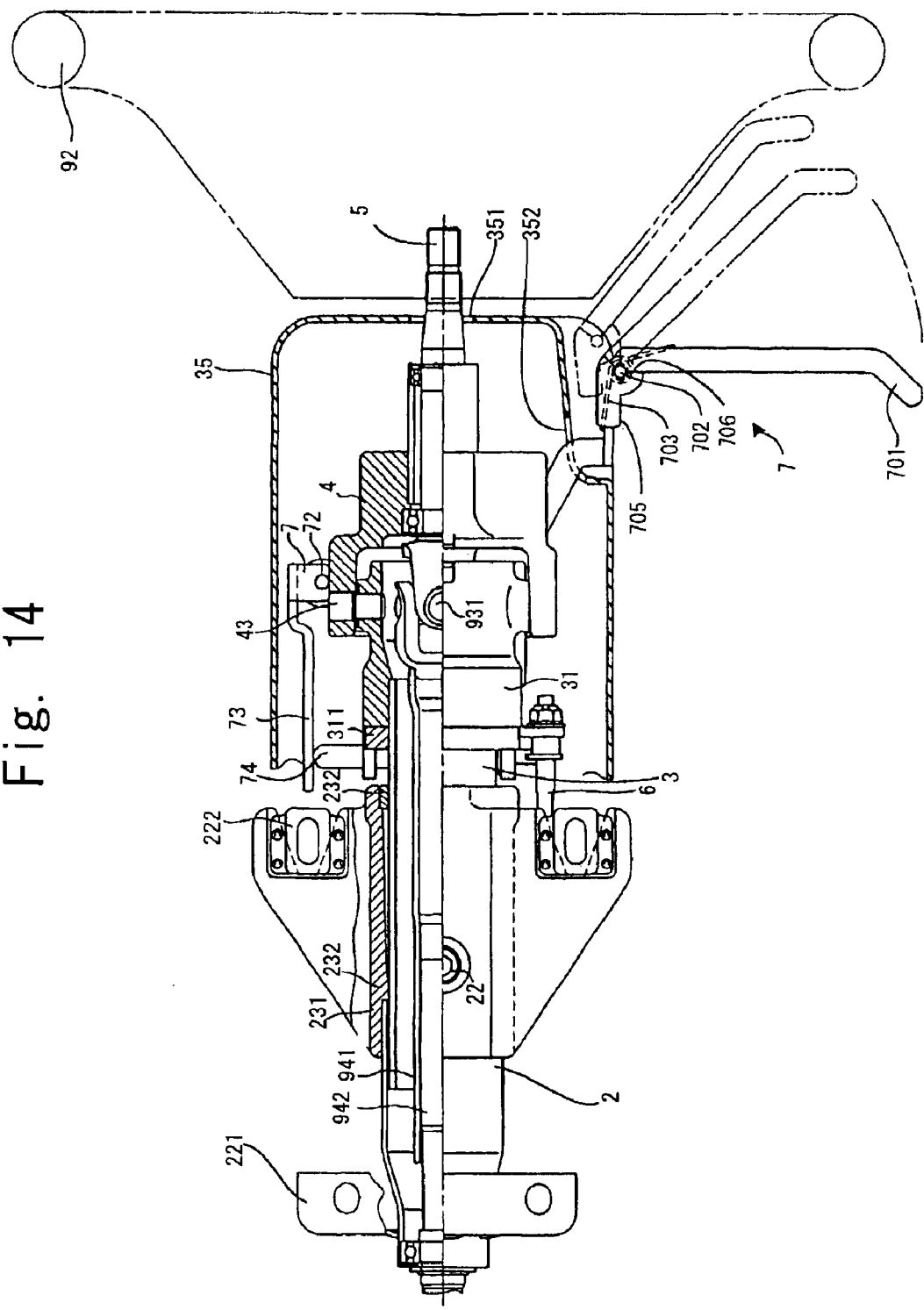
FIG. 14 is a top partly cutaway view (as viewed in the direction P) of FIG. 2, showing the steering column 1 of the fourth embodiment.

The steering column of the fourth embodiment has substantially the same structure as the first, second and third embodiments. No explanation will be given of overlaps of the embodiment. Furthermore, reference numerals used are substantially similar to those used in the explanation of the embodiments. The control lever 7 in the steering column is folded so that the control lever end 701 thereof will retreat to a position far away from the steering wheel 92. It should be noted, however, that the control lever is not fully folded like in the second and third embodiments. FIG. 14 is a top view, partly cut away, of the steering column according to the fourth embodiment corresponding to FIG. 3 in the first embodiment, and to FIG. 13 in the third embodiment.

The pivot shaft 702 and the coil spring 703 for folding the control lever end 701 are located near the root of the control lever 7. The control lever body 705 is provided with the locking surface 706 in order that, when retreating (during driving), the control lever end 701 will stop in a direction at about right angles to the control lever body 705. At the time of retreat, the control lever end 701 biased by the coil spring 703 hits on the locking surface, stopping in this position.

Fifth Embodiment

As previously explained, the clamp section of the telescoping mechanism is demanded not to slip with a force caused by the secondary collision when the air bag is operated. The steering column of the present embodiment can receive part of a force of a collision not only at the column clamp but at the column clamp shaft 6, whereby the air bag can be properly operated. The steering column of the fifth embodiment has substantially the same structure as those of the first to fourth embodiments on the whole. The overlapped part, therefore, will not be explained. Reference numerals are substantially the same as those used in the explanation of these embodiments.

Figure 15:
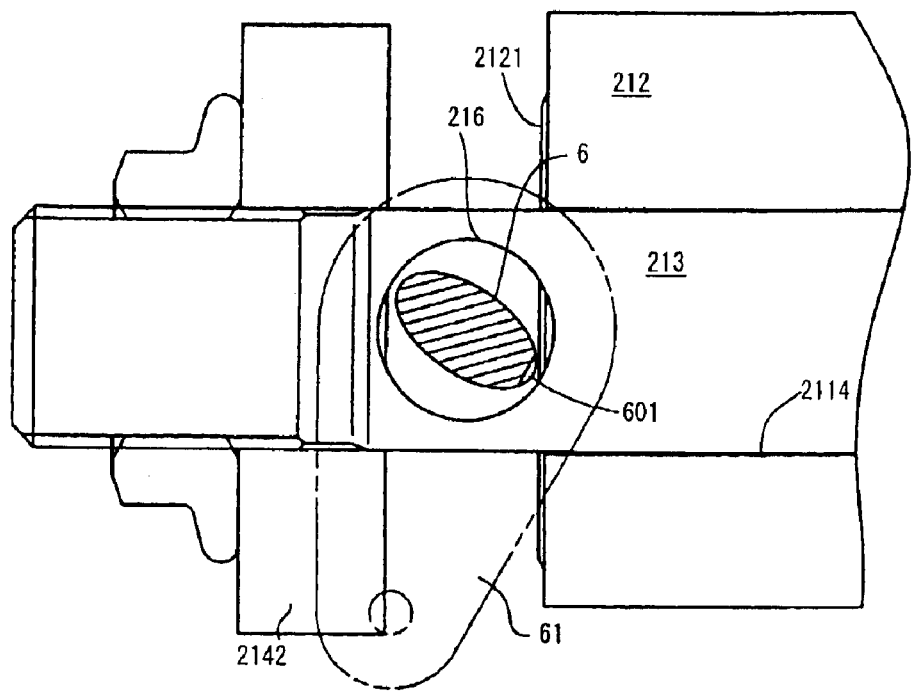
FIG. 15 is a partly enlarged view of the steering column of the fifth embodiment, corresponding to FIG. 8 of the first embodiment.
Figure 16:
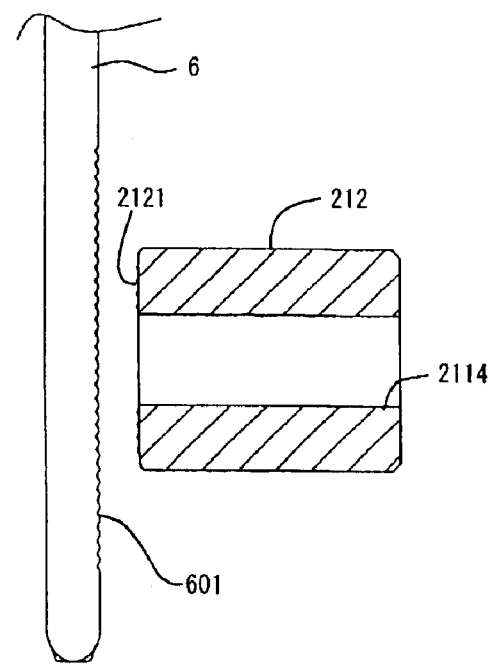
FIG. 16 is a partly enlarged view of the steering column 1 of the fifth embodiment.
Figure 17:
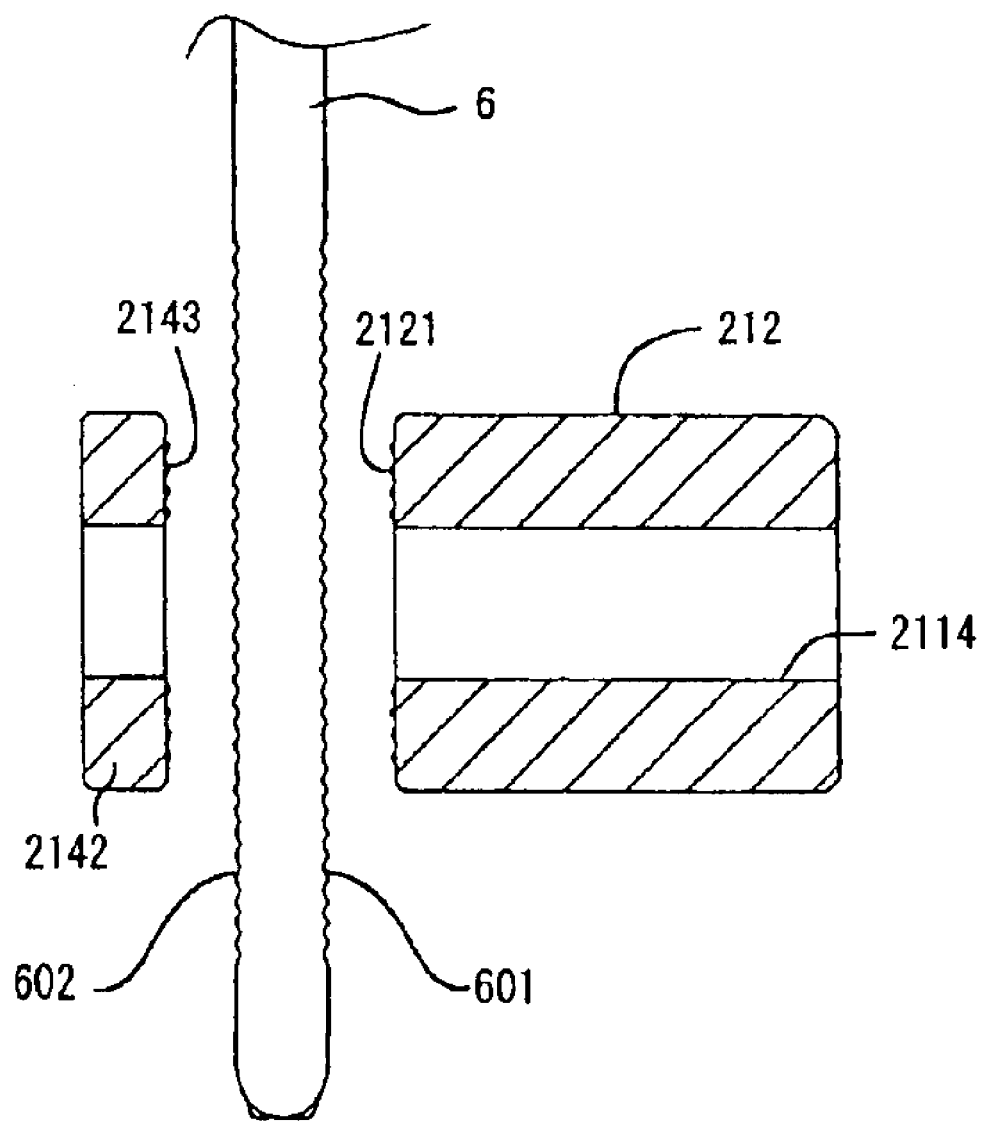
FIG. 17 is a partly enlarged view of the steering column 1 of the fifth embodiment partly modified.

FIG. 15 is a cross sectional view taken along line C—C which corresponds to FIG. 8 of the first embodiment; and FIG. 16 is an enlarged view of the column clamp shaft 6 and the second wedge 212. The end face of the second wedge 212 facing the column shaft 6, and the long-diameter portion of the column clamp shaft 6, that is, the portion facing the second wedge 212, are provided with projections and depressions 2121 and 601 respectively. These projections and depressions are mutually engageably formed. Therefore when the moving column member 3 is in a clamped state, the projections and depressions are engaged, so that a part of the force exerted to the wheel shaft 5 upon the secondary collision will be received by the column clamp shaft 6. Furthermore, as shown in FIG. 17, the projections and depressions 2143 and 602 may be formed on the other side of the column clamp shaft 6 and on the reaction member 2143.

According to the steering column of this invention, the telescopic mechanism and the tilting mechanism are clamped/unclamped by means of a single lever mounted in the vicinity of the steering wheel. Therefore, there exists no part appearing outside of the steering column, thus enabling reliable, smooth operation of the steering column. According to the steering column having the foldable control lever, each clamp/unclamp mechanism is hard to unclamp upon the secondary collision. The air back, therefore, can be reliably operated upon the secondary collision.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A steering column for motor vehicle, comprising:
    a fixed column member provided with a mounting section for mounting said steering column to a vehicle body;
    a moving column member which is supported on said fixed column member, and is unrotatable around said center axis and movable in said direction of said center axis;
    a column head mounted on one end side of said moving column member;
    a tilt head supported in a tiltable manner on said column head;
    a wheel shaft rotatably supported on said tilt head, for fixing a steering wheel on one end;
    a column clamp shaft mounted on said column head and rotatable around a center axis parallel with said center axis of said moving column member;
    a column clamp movable in relation to said column clamp shaft, for clamping/unclamping said moving column member on said fixed column member with the rotation of said column clamp shaft;
    a tilt head clamp for clamping/unclamping said tilt head on said column head;
    a control lever having a rocking pivot shaft on said tilt head; and
    a mechanical transmission apparatus which changes said rocking motion of said control lever into the rotation of said column clamp shaft, and transmits said rotation to said column clamp and said tilt head clamp.

2. A steering column according to claim 1, wherein said mechanical transmission apparatus has:
    a pusher rod slidable in a direction parallel with said tilt center axis of said tilt head and supported on said column head;
    a pusher plate which is mounted on said control lever and can contact one end of said pusher rod; and
    a rocking arm with one end engaged with said pusher rod and with the other end fixed on said column clamp shaft;
    with the operation of said control lever, said rocking motion of said control lever is changed successively into said rocking motion of said pusher plate, axial motion of said pusher rod, rocking motion of said rocking arm, and rotating motion of said column clamp shaft.

3. A steering column according to claim 2, wherein said pusher rod is provided with a spring for pushing said pusher rod toward said pusher plate.

4. A steering column according to claim 3, wherein said spring functions to impart a force to keep said control lever in a position off said steering wheel, and also said column clamp and said tilt head clamp in clamp positions thereof.

5. A steering column according to claim 1, wherein said column clamp shaft has a noncircular cross sectional form.

6. A steering column according to claim 5, wherein a noncircular cross sectional portion of said column clamp shaft is longer than the movable length of said moving column member.

7. A steering column according to claim 5, said noncircular cross section is substantially elliptical.

8. A steering column according to claim 1, wherein said pusher plate has a sufficiently wide contact surface capable of keeping contact with said pusher rod within the entire tilt range of said tilt head.

9. A steering column according to claim 1, wherein said control lever can be operated without releasing the thumb from said steering wheel.

10. A steering column according to claim 1, wherein said control lever has a control lever body section and a control lever end pivoted thereon; said control lever being foldable between an operating position, in which said control lever end is operable with a finger without removing the thumb from said steering wheel, and a retreat position which is off said steering wheel.

11. A steering column according to claim 10, wherein said control lever end is pressed by a spring toward the retreat position.

12. A steering column according to claim 11, wherein said control lever end has a locking projection, and a locking hole is formed in said tilt head, for fitting said locking projection therein when said control lever is folded in said retreat position.

13. A steering column according to claim 10, wherein said tilt head is provided with a cowl which covers said tilt head, and has a shaft hole through which said wheel shaft is installed and a lever hole which is separate from, or connected with, said shaft hole, and through which said control lever is installed, so that said control lever end will be close to said cowl when said control lever is folded to said retreat position.

14. A steering column according to claim 13, wherein said control lever end has a locking projection, and a locking hole is formed in said cowl for fitting said locking projection therein when said control lever is folded in said retreat position.

15. A steering column according to claim 1, wherein said column clamp comprises:

first and second wedges which have inclined surfaces facing said moving column member, and are slidably supported on said fixed column member;

a clamp bar secured on said first wedge for moving said wedges in mutually approaching directions; and a reaction member provided on said clamp bar; and said column clamp shaft being located between said second wedge and said reaction member, and having projections and depressions in contact surfaces thereof for mutual engagement.

16. A steering column according to claim 15, wherein said noncircular section is substantially elliptical, and is provided with said projections and depressions on the long-diameter portion.

* * * * *